Patented Oct. 17, 1922.

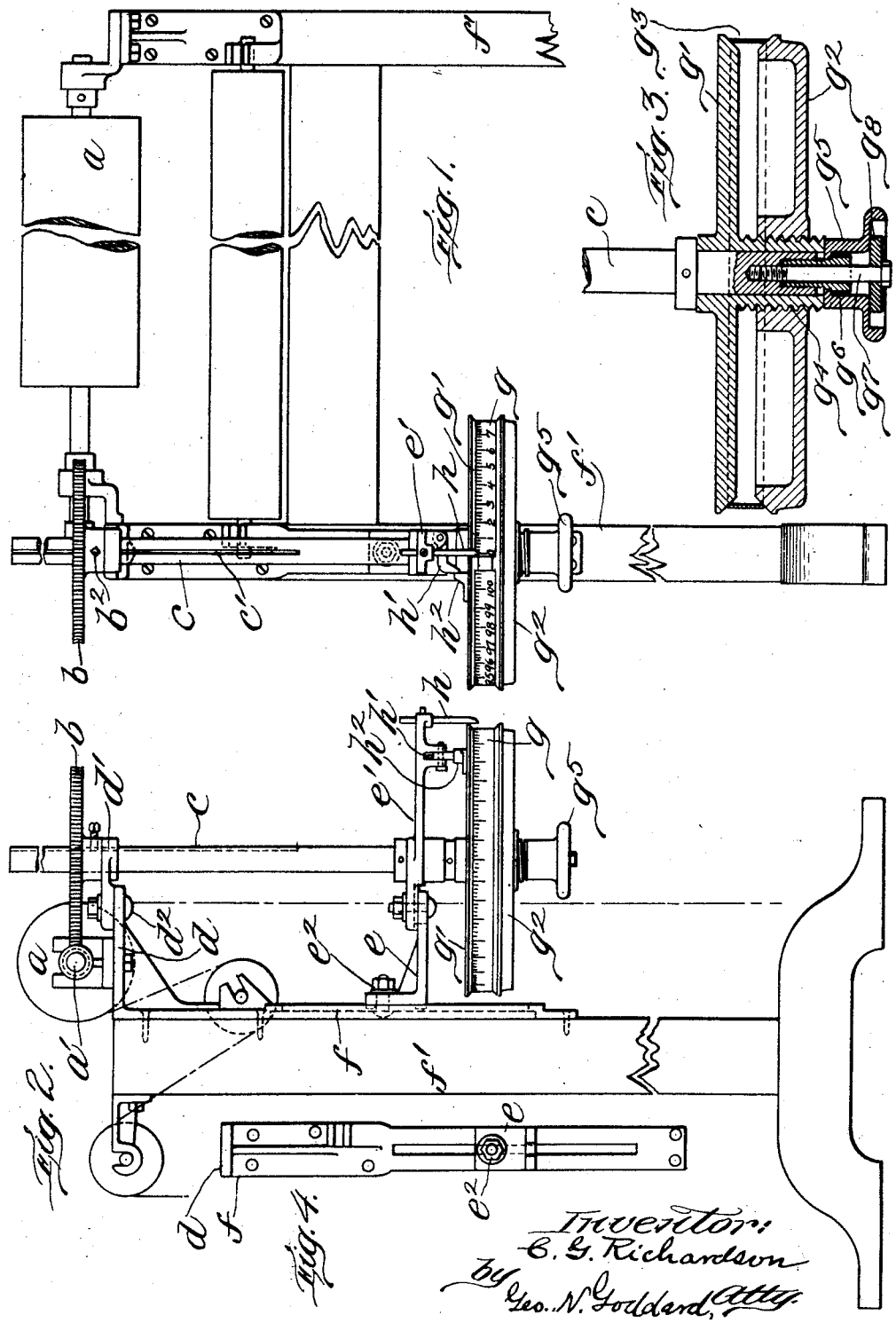

1,432,622

UNITED STATES PATENT OFFICE.

CHARLES G. RICHARDSON, OF SPRINGFIELD, VERMONT, ASSIGNOR TO PARKS & WOOLSON MACHINE COMPANY, OF SPRINGFIELD, VERMONT, A CORPORATION OF VERMONT.

PERCH CLOCK.

Application filed August 30, 1918. Serial No. 252,023.

*To all whom it may concern:*

Be it known that I, CHARLES G. RICHARDSON, a citizen of the United States, and resident of Springfield, county of Windsor, State of Vermont, have invented certain new and useful Improvements in Perch Clocks, of which the following is a specification.

The present invention relates to perch clocks such as are used in connection with the measuring and inspection of cloth.

Ordinarily in this class of devices there is connected with the overhead cloth roll a dial wheel rotated thereby for the purpose of indicating the measurement or yardage of the cloth passing over the roll. Usually in order to afford best opportunities for inspection of the cloth, the cloth-roll or drum is mounted at a very considerable height above the floor so that it is often difficult to accurately read the scale on the measuring dial.

The present invention is intended to provide a simple and convenient construction by which the dial register while maintaining a normally operative driving engagement with the cloth-roll may be capable of adjustment to any level or height most convenient for the quick and accurate reading of the dial when the machine is in use.

To this end the invention comprises generally speaking the combination of a rotary cloth-roll carried in its supporting frame and a vertical dial shaft operatively connected with the cloth-roll to be rotated in co-ordination therewith, said connection being adjustable to permit raising and lowering the dial without affecting the actuating connection between the dial and the cloth-roll, while providing suitable bearing support at all stages of the adjustment.

This and other features of the invention will be fully described in the following specification and will be defined as to their novelty in the claims annexed hereto.

In the accompanying drawings I have illustrated a convenient arrangement embodying the principles of this invention in which drawings Figure 1 is a front elevation of the perch clock in its relation to the cloth roll;

Figure 2 is a side elevation of the same;

Figure 3 is a central section showing in detail the construction of the adjustable dial.

Figure 4 is a front elevation showing the lower supporting bracket and its supporting plate.

According to the form of the invention illustrated in the drawings the cloth-roll $a$, over which the cloth to be measured and inspected is drawn, is mounted in suitable bearings carried by the uprights $f'$ of the supporting frame.

One end of the cloth-roll shaft is provided with a worm $a'$ which intermeshes with a horizontal worm-gear $b$ mounted on the vertical dial shaft $c$. As shown at $c'$ the shaft $c$ is provided with a splineway or groove to receive a spline carried by the gear $b$ which, in this case, consists of the screw $b^2$ whose tapered end projects into the groove $c'$ to cause the shaft to rotate positively in unison with the worm-gear $b$ while allowing the shaft to be vertically adjusted with relation to the worm-gear.

Upper and lower bearing brackets form appropriate guide bearings for holding the shaft $c$ in proper working position. The upper bracket comprises a fixed member $d$ and a bearing member $d'$ adjustably bolted to the member $d$ by the bolt $d^2$ so as to properly position and align the shaft. The lower bracket also comprises a fixed member $e$ to which is bolted an adjustable bearing member $e'$ to permit adjustment to properly align the shaft in the different positions of its vertical adjustment.

The lower bracket member $e$ is adjustably secured to a slotted rail or bracket $f$ by means of the adjusting bolt $e^2$, the slotted guide or bracket $f$ being secured to the upright $f'$ of the supporting frame.

To the lower end of the shaft $c$ is adjustably secured the dial wheel $g$. This comprises as shown in Figure 3 the two circular spiders $g'$, $g^2$ whose inner peripheral edges are beveled to adjustably support the circular spring metal band $g^3$ on which the scale marks are accurately located to indicate the yardage. The two spiders are adjustably connected by means of the screw threaded hub $g^4$ and the entire spider is clamped to the end of the shaft through the agency of the clamping nut $g^5$ which embraces or surrounds the head of tubular bolt $g^6$ so as to rotate the same and thereby clamp the nut $g^5$ frictionally against the lower end of the hub $g^4$. The construction of the adjustable dial itself forms no part of the present invention but is substantially the same in construction as that shown in applicant's Letters Patent of the United States dated May 27, 1919 No. 1,304,603, although it will be understood that any suitable form of dial may be used in connection with the present invention.

A pointer $h$ is supported in the forwardly extending portion of the bearing bracket $e'$ and in said bracket is also mounted a pivoted dog or latch $h'$ arranged to abut against a stop member $h^2$ that is fixed to the upper member $g'$ of the dial. The pointer and the stop member and the scale are so correlated as to position that when the stop member abuts against the latch $h'$, as shown in Figure 1, the pointer will register with the zero mark. This facilitates the quick return of the dial wheel to the zero position after each piece of cloth is measured without requiring the exacting attention of the inspector.

Since the adjusting of the two spiders nearer together will expand the graduated scale element $g^3$, while their separation will allow it to contract always concentrically to the axis of the shaft, provision is thus afforded for the accurate adjustment of the dial for different kinds of cloth being measured in order to compensate for differences in stretch of various kinds of cloth.

The hand wheel or clamping nut $g^5$ has a recess in its bottom fitting around the polygonal head of the tubular bolt $g^6$ which is threaded into the lower end of the shaft $c$. The upper face of the nut $g^5$ abuts against the lower end of the hub $g^4$ so that turning this nut up clamps the dial wheel at the zero point for measurement purposes while the slacking of the nut releases the dial wheel for re-setting. A screw $g^7$ passed through the disk $g^8$ serves to prevent the parts from falling off the shaft if the nut $g^5$ be turned back too far.

The worm and gear connection between the cloth roll shaft and the axially adjustable vertical dial shaft is preferred because it prevents any tendency to cause a partial rotation of the cloth roll by the dial shaft when the dial wheel is being turned back or reset. If it be desired to measure an extra length piece of cloth greater than the dial capacity so that the measurement must take place in two operations, it is advantageous, in fact necessary for accurate measurement, that the cloth roll be held stationary during this resetting operation. With this connection any tendency due to the friction of the dial wheel on its shaft to cause rotation of the dial shaft and of the cloth roll is entirely prevented. Moreover, such connection admits of the use of a comparatively small gear wheel for the dial shaft thereby permitting the dial and its shaft to be mounted in close proximity to the cloth.

What I claim is:

1. In a perch clock for measuring cloth, the combination of a rotary cloth-roll mounted in its supporting frame, a vertical dial shaft operatively connected with the cloth-roll to be rotated in co-ordination therewith said operative connection having an adjustment permitting the raising and lowering of the dial shaft, a dial secured to said shaft to rotate therewith, and a lower bearing member affording support for said dial shaft and adjustable vertically to accommodate it to the different positions of adjustment of said dial shaft and dial, substantially as described.

2. In a perch clock, the combination of a rotary cloth-roll, a vertical dial shaft operatively connected with said cloth-roll to be rotated in co-ordination therewith a dial mounted on said shaft to rotate therewith, and means whereby the dial may be raised or lowered to different levels while maintaining operative connection with the cloth-roll in the different positions of adjustment, substantially as described.

3. In a perch clock, the combination with a rotary cloth-roll, of a vertical dial shaft, a measuring dial frictionally clamped on said shaft to normally rotate therewith while permitting a circumferential adjustment thereon and a worm and gear connection for transmitting rotation from the cloth-roll to the dial shaft, substantially as described.

4. In a perch clock, the combination of a cloth-roll, a vertical dial shaft operatively connected with the cloth-roll to be rotated thereby, a measuring dial mounted on said dial shaft to rotate therewith, a bearing bracket adjustably secured to a fixed support to permit adjustment axially of said dial shaft, said dial shaft being itself axially adjustable in order to position the dial at any desired level, substantially as described.

5. In a perch clock, the combination of a cloth-roll, a dial shaft operatively connected therewith for rotation, a measuring dial secured to said shaft to have circumferential adjustment thereon, a stop member for arresting the rotative adjustment of said dial, and a fixed pointer located to register with the zero mark on the dial when the dial member is held against said stop member, substantially as described.

6. The combination with a cloth-roll, of a dial shaft operatively connected therewith for rotation, a measuring dial mounted upon said shaft, and means for clamping said measuring dial frictionally upon the dial shaft with any desired degree of pressure to cause the dial to rotate normally in unison with said shaft while permitting the dial to be turned about said shaft in order to reset the dial for the next measuring operation, substantially as described.

In witness whereof, I have subscribed the above specification.

CHARLES G. RICHARDSON.